United States Patent Office 3,190,907
Patented June 22, 1965

3,190,907
AMINOETHANESULFONIC ACID ARYL ESTERS
Harry Distler, Gerhard Leibner, Klaus Juergen Fust, and Ernst-Heinrich Pommer, Ludwigshafen (Rhine), and Herbert Stummeyer, Mannheim, Germany, assignors to Badische Anilin- & Soda-Fabrik Aktiengesellschaft, Ludwigshafen (Rhine), Germany
No Drawing. Filed May 14, 1962, Ser. No. 194,708
Claims priority, application Germany, May 20, 1961, B 62,571
3 Claims. (Cl. 260—456)

This invention relates to new fungicidal compounds. Especially it relates to aminoethyl sulfonic esters which have fungicidal properties.

We have found that compounds of the formula

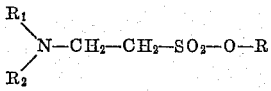

in which $R_1$ may be identical with or different from $R_2$ and each of $R_1$ and $R_2$ denotes an unsubstituted or substituted alkyl or cycloalkyl group or hydrogen or $R_1$ and $R_2$ together with the N denote a heterocyclic radical, and R is an unsubstituted or substituted aryl radical or a tetrahydronaphthyl radical, and their salts, are good fungicides.

We have also found good fungicidal properties in the compounds of the formula

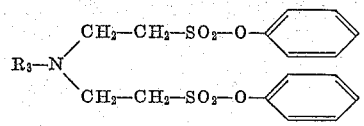

wherein $R_3$ represents a methyl or cyclohexyl radical, and their salts.

By salts we mean salts with inorganic or organic acids, for example hydrochloric acid, sulfuric acid, acetic acid or formic acid.

These new compounds are obtained in a simple way by adding on ammonia or amines to $\alpha,\beta$-unsaturated sulfonic acid esters, in accordance with the following reaction scheme:

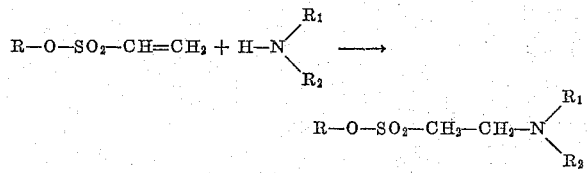

R, $R_1$ and $R_2$ having the above meanings.

The $\alpha,\beta$-unsaturated sulfonic acid esters to be used as initial materials are obtainable from the corresponding hydroxy compounds by reaction with $\beta$-chloroethanesulfochloride by the method described in the copending U.S. application Ser. No. 43,009, filed July 15, 1960, and now U.S. Patent No. 3,121,730, by Harry Distler. For example vinylsulfonic acid phenyl ester, vinylsulfonic acid cresyl ester, 2- or 3- or 4-chlorophenylvinylsulfonic acid esters, 2,4-dichlorophenylvinylsulfonic acid esters, 2,4,5-trichlorophenylvinylsulfonic acid esters, 2,4,6-trichlorophenylvinylsulfonic acid esters, 2-methyl-4-chlorophenyl-vinylsulfonic acid esters, pentachlorophenylvinylsulfonic acid esters, $\alpha$- or $\beta$-naphthylvinylsulfonic acid esters, 2,4,6-tribromophenylvinylsulfonic acid esters, pyrocatecholdivinylsulfonic acid esters, hydroquinonedivinylsulfonic acid esters and resorcinoldivinylsulfonic acid esters are suitable as initial materials for the production of the compounds to be used according to this invention.

Ammonia or primary or secondary amines are suitable for adding on to these $\alpha,\beta$-unsaturated sulfonic acid esters. Examples are methylamine, dimethylamine, methylethylamine, diethylamine, ethylamine, n-propylamine, isopropylamine, butylamine, dibutylamine, ethylenimine, hexamethylenimine, hexylamine, decylamine, benzylamine, laurylamine, cetylamine, stearylamine, methylstearylamine, methyllaurylamine, cyclohexylamine, N-methylcyclohexylamine, allylamine, diallylamine, pyrrolidine, N-methylaniline, aniline, or poly-basic aliphatic amines, for example propylene diamine, hexamethylenediamine, ethylenediamine or hydrazine or its substitution products, similarly oxyethylated amines, for example ethanolamine or diethanolamine and also propanolamine or dipropanolamine.

Reaction between the $\alpha,\beta$-unsaturated sulfonic acid ester and the amine proceeds even at low temperature or room temperature. In some cases it is necessary to heat the reaction mixture on a waterbath to complete the reaction. The components are preferably used in stoichiometric ratio. An excess of one or other component is usually not necessary because the reaction almost always proceeds quantitatively.

For example the process may be carried out by placing the $\alpha,\beta$-unsaturated sulfonic acid ester in the cold in a suitable vessel and allowing the amine to drip in. If only one hydrogen atom is to be reacted in the case of primary amines, it is necessary to work with an excess of amine and at the lowest possible temperature and to add the sulfonic acid ester to the amine slowly.

Working up the reaction mixture may take place in the conventional ways. For example the reaction product may be poured into water, washed and dried with the usual siccatives. The last traces of solvent or water may then be removed in vacuo at moderately elevated temperature, for example at about 40° to 50° C. Distillation of the compounds is not advisable because for the most part they cannot be distilled without decomposition.

The new sulfonic acid esters substituted on nitrogen may be converted into their water-soluble salts with acids. Taurines are formed by saponification of the esters with alkalies.

The following examples illustrate methods of preparation but do not limit the invention. Unless otherwise stated, parts are by weight. Parts by weight and parts by volume are in the same relation as the gram and milliliter.

EXAMPLE 1

618 parts of 40% aqueous dimethylamine solution is dripped during the course of three hours while stirring into 920 parts of vinylsulfonic acid phenyl ester and 236 parts of methanol at 20° C. Then the aqueous layer is separated and the organic phase washed twice, each time with 150 parts of water and dried at 30° C. in vacuo. 1,089 parts of N-dimethylaminoethanesulfonic acid phenyl ester (95% of the theory) is obtained. D. 20° C.= 1.1795; $n_D^{20}$=1.5156; boiling point (0.5 mm. Hg)=130° C. (with partial decomposition).

*Analysis.*—Found: C, 52.6%; H, 6.4%; O, 20.7%; N, 6.2%; S, 14.0%. Calculated: C, 52.38%; H, 6.59%; O, 20.94%; N, 6.11%; S, 13.98%.

The following sulfonic acid esters may be obtained in an analogous way:

| Example | $\begin{array}{c}HO-CH_2-CH_2\\ \phantom{HO-CH_2-CH_2}N-CH_2-CH_2-SO_2-OR\\ HO-CH_2-CH_2\end{array}$ | $n_D^{20°}$ |
|---|---|---|
| 2 | R= —C₆H₅ (phenyl) | 1.5275 |
| 3 | 2-chlorophenyl | 1.5425 |
| 4 | 3-chlorophenyl | 1.5450 |
| 5 | 4-chlorophenyl | 1.5430 |
| 6 | 2,3-dichlorophenyl | 1.5550 |
| 7 | 2,4-dichlorophenyl (m.p. 68° C.) | |
| 8 | 2,4,6-trichlorophenyl | $n_D^{40°}$=1.5690 |
| 9 | 2,4,6-trichlorophenyl (m.p. 112° to 113° C.) | |
| 10 | 4-methylphenyl | 1.5310 |
| 11 | 4-chloro-3-methylphenyl | $n_D^{40°}$=1.5335 |
| 12 | 4-chloro-2-methylphenyl | $n_D^{40°}$=1.5345 |
| 13 | 2-chloro-5-methylphenyl | $n_D^{40°}$=1.5340 |
| 14 | 4-isopropylphenyl (—C(CH₃)₃ group: 4-tert-butylphenyl) | 1.5187 |
| 15 | 2-(methoxycarbonyl)phenyl (H₃COOC—) | 1.5338 |
| 16 | 4-C₈H₁₇-phenyl | 1.5185 |
| 17 | 4-(COOC₂H₅)phenyl | 1.5284 |
| 18 | 4-C₁₂H₂₅-phenyl | 1.5100 |

| Example | $HO-CH_2-CH_2$<br>$\phantom{HO-CH_2-CH_2}N-CH_2-CH_2-SO_2-OR$<br>$HO-CH_2-CH_2$ | $n_D^{20°}$ |
|---|---|---|
| 19 | —[naphthyl, H] | 1.5442 |
| 20 | —[naphthyl] | 1.5775 |

| Example | $CH_3$<br>$\phantom{CH_3}N-CH_2-CH_2-SO_2-OR$<br>$CH_3$ | $n_D^{20°}$ |
|---|---|---|
| 21 | R=—⟨phenyl⟩ | 1.5156 |
| 22 | —⟨2,4,6-trichlorophenyl⟩ (m.p. 72° C.) | |
| 23 | —⟨pentachlorophenyl⟩ (m.p. 134° to 138° C.) | |
| 24 | —⟨phenyl⟩—COOC$_2$H$_5$ | 1.5157 |

| | | Analysis, percent | |
|---|---|---|---|
| | | N calculated | N found |
| 25 | —⟨phenyl⟩—CH$_3$ | 5.76 | 5.7 |
| 26 | $C_2H_5$<br>$\phantom{C_2H_5}N-CH_2-CH_2-SO_2O-$⟨phenyl⟩<br>$C_2H_5$ | 5.45 | 5.3 |
| 27 | $C_4H_9$<br>$\phantom{C_4H_9}N-CH_2-CH_2-SO_2O-$⟨phenyl⟩<br>$C_4H_9$ | 4.47 | 4.7 |
| 28 | $\phantom{CH_3-N}CH_2-CH_2-SO_2O-$⟨phenyl⟩<br>$CH_3-N$<br>$\phantom{CH_3-N}CH_2-CH_2-SO_2O-$⟨phenyl⟩ | 3.5 | 3.2 |
| 29 | $\phantom{⟨H⟩-N}CH_2-CH_2-SO_2O-$⟨phenyl⟩<br>⟨H⟩—N<br>$\phantom{⟨H⟩-N}CH-CH-SO_2O-$⟨phenyl⟩ | 3.0 | 2.8 |

The compounds according to this invention are characterized by very good fungicidal properties. They may be used in admixture with other active substances, as for example acaricides, insecticides, ovicides, herbicides, fungicides and bactericides.

The fungicides according to the invention may be prepared by mixing the active substances with the conventional diluents or carriers, as for example water, organic liquids, dispersing agents or wetting agents, solid inert substances or mixtures of the said substances. They are used by conventional methods, for example to control fungi on agricultural crop plants.

The following table gives the inhibition values of some of the compounds according to this invention in respect of the fungus *Aspergillus niger*. Nutrient solutions are inoculated with fungus spores and incubated for 120 hours at 36° C. The extent of the fungoid growth is then estimated according to the following graduated scale:

(1) No fungus growth
(2) Slight growth of fungus
(3) Moderate growth of fungus
(4) Marked growth of fungus
(5) Continuous covering of fungus

*Inhibition values with respect to Aspergillus niger*

| Active substance of Example No. | Amount of active substance in parts per thousand parts of nutrient solution ||||||
|---|---|---|---|---|---|---|
|  | 65 | 30 | 10 | 7 | 3 | 1 |
| 21 | 1 | 2 | 4 | 4 | 5 | 5 |
| 25 | 1 | 1-2 | 4 | 5 | 5 | 5 |
| 22 | 1 | 1 | 5 | 5 | 5 | 5 |
| 27 | 1 | 2-3 | 5 | 5 | 5 | 5 |
| 2 | 1 | 1 | 5 | 5 | 5 | 5 |
| 10 | 1 | 1 | 4 | 5 | 5 | 5 |
| 19 | 1 | 1 | 4 | 5 | 5 | 5 |
| 7 | 1 | 1 | 1 | 2 | 4 | 5 |
| 28 | 1 | 2 | 5 | 5 | 5 | 5 |
| 29 | 1 | 2 | 5 | 5 | 5 | 5 |

What we claim is:

1. A compound selected from the class consisting of the formulae $$\begin{matrix} R_1 \\ \phantom{R}\diagdown \\ \phantom{RR}N\text{—}CH_2\text{—}CH_2\text{—}SO_2OR \\ \phantom{R}\diagup \\ R_2 \end{matrix}$$

and $$R_3\text{—}N \begin{matrix} CH_2\text{—}CH_2\text{—}SO_2\text{—}O\text{—}\phi \\ CH_2\text{—}CH_2\text{—}SO_2\text{—}O\text{—}\phi \end{matrix}$$

and their acid addition salts wherein:

R represents a radical selected from the group consisting of phenyl, naphthyl, tetrahydronaphthyl, and phenyl containing at least one substituent selected from the group consisting of chloro, methyl, tertiary butyl, octyl, dodecyl and ethoxycarboxyl;

$R_1$ and $R_2$ each represents a radical selected from the group consisting of alkyl of 1 to 4 carbon atoms and 2-hydroxyethyl; and $R_3$ represents a radical selected from the group consisting of methyl and cyclohexyl.

2. The compound of the formula

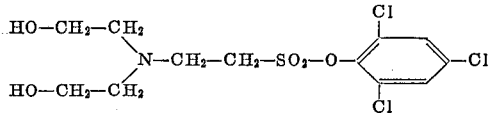

3. The compound of the formula

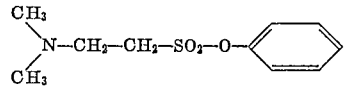

References Cited by the Examiner

UNITED STATES PATENTS

| 2,241,769 | 5/41 | Dickey et al. | 260—456 |
| 2,721,875 | 10/55 | Dickert et al. | 260—456 |
| 2,830,082 | 4/58 | Sexton et al. | 260—456 |
| 2,853,416 | 9/58 | Kellog | 167—33 |
| 2,894,971 | 7/59 | O'Rear et al. | 260—456 |
| 2,920,997 | 1/60 | Wolf et al. | 167—33 |
| 2,978,477 | 4/61 | Linden | 260—456 |

OTHER REFERENCES

Tatsuoka: C.A., vol. 44, p. 4471 (1950).
Fujii: C.A., 51, p. 424 (1957).
Ringier: Helv. Chim. Acta., vol. 27, pp. 1790–1795 (1944).

CHARLES B. PARKER, *Primary Examiner.*

D. T. McCUTCHEN, NICHOLAS S. RIZZO,
*Examiners.*